(No Model.)

U. H. HILLMAN.
VACUUM PAN.

No. 269,575. Patented Dec. 26, 1882.

Attest:
F. W. Howard
J. W. Reynolds, Jr.

Inventor:
Uno H. Hillman
by Geo. A. Sawyer.
Attorney.

UNITED STATES PATENT OFFICE.

UNO H. HILLMAN, OF NEW YORK, N. Y.

VACUUM-PAN.

SPECIFICATION forming part of Letters Patent No. 269,575, dated December 26, 1882.

Application filed April 28, 1882. (No model.)

*To all whom it may concern:*

Be it known that I, UNO H. HILLMAN, residing at New York, in the county of New York and State of New York, have invented certain new and useful Improvements in Vacuum-Pans, of which the following is a specification, reference being had therein to the accompanying drawings.

The object of my invention is to furnish an improved form of vacuum-pan specially adapted to reducing fluids to a thickened or stiff mass or even to dryness, as is necessary with some substances which undergo rapid chemical changes, and of such a form as will facilitate the removal of the thickened or dry mass from the pan, and will present the greatest advantages in cleansing and manipulation; and I declare the following to be a full, clear, and exact description of the same, reference being had to the accompanying drawings, in which—

Figure 1:
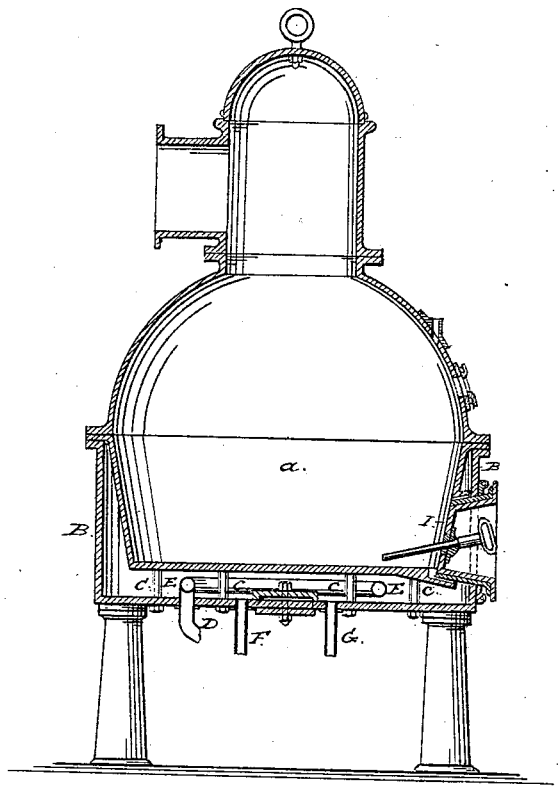
Figure 2:
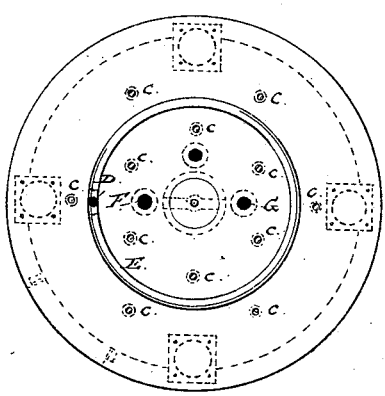

Figure 1 shows a vertical section, and Fig. 2 a plan, of my improvement.

Similar letters of reference indicate similar parts.

A is the pan proper, made in two sections, the base slightly conical and smaller at the bottom, and the upper section hemispherical, with or without a dome, as may be necessary. The pan is adapted to be filled with the fluid to be treated to about the height of the lower section, and this section is therefore surrounded by a jacket, B. The bottom of the pan is flat, as is also the bottom of the jacket, and the inner pan is supported and connected with the bottom of the jacket by thimbled studs c c, made of brass or any other suitable material. The jacket has a hole in its bottom for cleaning and repairing. A copper pipe, D, enters the jacket and is connected with the coil E, through which live steam is introduced to heat the water. This coil has small holes on its sides, so that the steam is uniformly poured out on both sides into the water. A hot-water pipe, F, and a cold-water pipe, G, also enter the jacket for the better, quicker, and more perfect regulation of the temperature of the water which fills the jacket. There is also a discharge-pipe, H. The whole apparatus is supported on pillars or any other convenient setting. The pan is provided with a door arranged on a level with the bottom of the pan, so that the thickened or dried substance may be readily drawn out without encountering any irregularities of surface. The door is also provided with a proving-rod. The outside of the pan may be covered with some non-conducting substance. Thermometers and barometers are applied, as usual.

There is nothing in my improved form which would prevent the introduction and use of a steam-coil within the pan itself; but where fluids are evaporated nearly to dryness the pipes present serious obstacles to the removal of said substance and to the effectual cleansing of the pan.

The advantages of this arrangement are obvious. The absence of interior pipes and the flat bottom and low-down door facilitates and permits the extraction of the dried substance and the thorough cleaning of the pan, while the lower jacketed section and the system of steam and hot and cold water pipes renders the control of temperature absolute and perfect.

Having thus described my improvement, what I claim as new, and desire to secure by Letters Patent, is—

1. A vacuum-pan composed of two sections, the upper one dome-shaped, the lower one slightly conical and flat-bottomed and enveloped by a water-retaining jacket connected by pipes with suitable means for heating, and provided with a low-down door for conveniently discharging its contents, substantially as described.

2. The combination of the vacuum-pan A, composed of two sections, the jacket B, enveloping the lower section, the hot and cold water pipes E and G, and the low-down door, substantially as described.

In testimony whereof I affix my signature in presence of two witnesses.

UNO H. HILLMAN.

Witnesses:
S. CYRUS TOWNSEND,
W. L. TOWNSEND.